United States Patent [19]

Groult

[11] 4,434,910
[45] Mar. 6, 1984

[54] SEALING DEVICE AND PROCESS FOR A METAL PACK

[75] Inventor: Jacques Groult, Verneuil, France

[73] Assignee: Safet-Embamet Lethias, Villeneuve-la-Garenne, France

[21] Appl. No.: 451,933

[22] Filed: Dec. 10, 1982

[30] Foreign Application Priority Data

Dec. 14, 1981 [FR] France .............................. 81 23266

[51] Int. Cl.³ .............................................. B65D 53/00
[52] U.S. Cl. ...................................... 220/358; 220/378
[58] Field of Search ...................... 220/358, 378, 352; 215/341, 346

[56] References Cited

U.S. PATENT DOCUMENTS

| | | | |
|---|---|---|---|
| 1,747,591 | 2/1930 | Moore | 220/358 |
| 1,837,345 | 8/1930 | Thomas | 220/358 |
| 3,235,121 | 2/1966 | Hexel | 220/358 |

FOREIGN PATENT DOCUMENTS

| | | |
|---|---|---|
| 674981 | 3/1966 | Belgium . |
| 1381587 | 11/1964 | France . |
| 86101 | 11/1965 | France . |
| 2340189 | 2/1977 | France . |

*Primary Examiner*—George T. Hall
*Attorney, Agent, or Firm*—Wenderoth, Lind & Ponack

[57] ABSTRACT

This sealing device for a cylindrical metal pack having a total opening, of the type comprising a recipient and a pressed-out cover and in which the inner peripheral surface of the opening of the recipient, which is devoid of an inner radial flange, cooperates directly with the outer cylindrical surface of the cover, comprises at least one partly O-section sealing element (11, 12) of a copolymer resin adhered in at least one cylindrical groove (9, 10) provided in the region of the recipient and/or the cover in which occurs a rubbing between the cooperating parts of the inner wall (8) of the opening of the recipient and of the outer peripheral wall of the cover when the cover (5) is placed in position and removed.

9 Claims, 5 Drawing Figures

SEALING DEVICE AND PROCESS FOR A METAL PACK

DESCRIPTION

The present invention relates to metal packs for containing products the nature of which requires a very effective barrier against leakages and more particularly relates to a hermetic closing device which resists impacts for such packs.

In most metal packs, in particular of tinned iron sheet comprising a cover, for example paint cans, this cover of circular shape is usually pressed out, has a central portion which is crowned or otherwise, and includes on its periphery a flange folded in such manner as to form a cylindrical outer surface which extends axially and whose free upwardly facing edge is usually curled, the assembly having high rigidity.

The cylindrical outer surface of this cover is adapted to be fitted in the opening provided in the upper end of the can constituting the pack and having an axial cylindircal surface which is a force fit with said cylindrical surface of the cover.

This axial cylindrical surface of the opening of the can is usually formed on the inner periphery of a flange formed in a conventional manner from an annular pressed-out part having at least one fold and formed over onto the edge of the opening of the can.

This annular member forming an intermediate radial flange thus mounted on the periphery of the opening of the can imparts to the latter high rigidity so that, when the pack falls on the ground, the periphery of its opening is sufficiently strong and the cover is not expelled from the cavity therefor.

The relatively recent use of a new technique for manufacturing tin cans, in which the welded or formed-over longitudinal seam of the two edges of the sheet forming the wall of the can is replaced by an edge-to-edge or butt joint achieved by a micro spot welding, permits the manufacture of cheaper cans and this cheapness is still further increased by eliminating the inner radial annular flange which must be formed-over onto the open end of the pack and requires stock and labour for effecting the numerous required operations.

The use of this joint technique without extra thickness could permit such a saving by fitting a conventional cover in the opening of the can whose edge would be merely curled.

However, this presents a problem due to the fact that the periphery of the opening of the can is much less rigid, so that, in the event of impact, for example if the can falls on the ground, the cover becomes detached.

The insertion of a sealing element of an elastomeric material between the outer lateral wall of the cover and the inner wall of the can is not satisfactory since, in order to retain the cover in the case of impact resulting from a falling of the can, the necessary compression implies such thickness that the sealing element is torn away when the cover is placed in position with a drive fit.

In such packs, it has also been attempted to dispose a sealing element of an elastomeric material against an outer shoulder of the lateral surface of the cover, this element being adapted to be gripped between this shoulder and the flange of the wall of the can.

This arrangement only permits ensuring the seal in as much as the outer flange of the cover is folded over in engagement with the outer flange of the can so as to maintain the sealing element in a gripped condition.

Further, the elastomeric material employed for these joints must be inert with respect to the contents of the pack and must not be attacked or destroyed by these contents and not contaminate these products either, for example in the case of food products.

None of these arrangements have consequently permitted the construction of such packs which are capable of standing up to the severe tests concerning impact resistance which are imposed at the present time.

An object of the invention is to overcome these various drawbacks and to provide a metal pack comprising a device for sealing and maintaining the cover which is extremely reliable, cheap to manufacture and is capable of ensuring the seal without gripping means throughout the duration of the utilisation of the pack and is capable of standing up to impact resistance tests.

The invention therefore provides a sealing device for a pack of the can type of tinned iron sheet, in which the inner surface of the opening of the can, which is devoid of an inner radial flange, cooperates directly with the outer cylindrical surface of a pressed-out cover, said device comprising at least one partly toric sealing element of a copolymer resin adhered in at least one circular groove provided in the region in which occurs a rubbing between the cooperating portions of the can and cover when the cover is placed in position and is removed.

According to a first embodiment of the invention, on the inner surface of the wall comprises in said rubbing region two adjacent grooves each containing a sealing element.

According to another feature of the invention, said sealing element is placed in the hot condition in said grooves with the use of the action of centrifugal force.

According to another embodiment of the invention, the outer cylindrical wall of the cover comprises at least one groove in which the sealing element is disposed.

According to another feature of the invention, said sealing element is disposed in the groove of the outer cylindrical surface of the cover by turning the latter in a vertical plane.

According to yet another embodiment of the invention, a first groove is formed in the inner surface of the wall of the can, and a second groove is formed in the outer cylindrical wall of the cover, said second groove being disposed in such manner that, in the closed position of the can, the second groove is located between the first groove and the outer edge of the can.

Further features and advantages of the invention will be apparent from the ensuing description with reference to the accompanying drawing which is given merely by way of example and in which.

Figure 1:
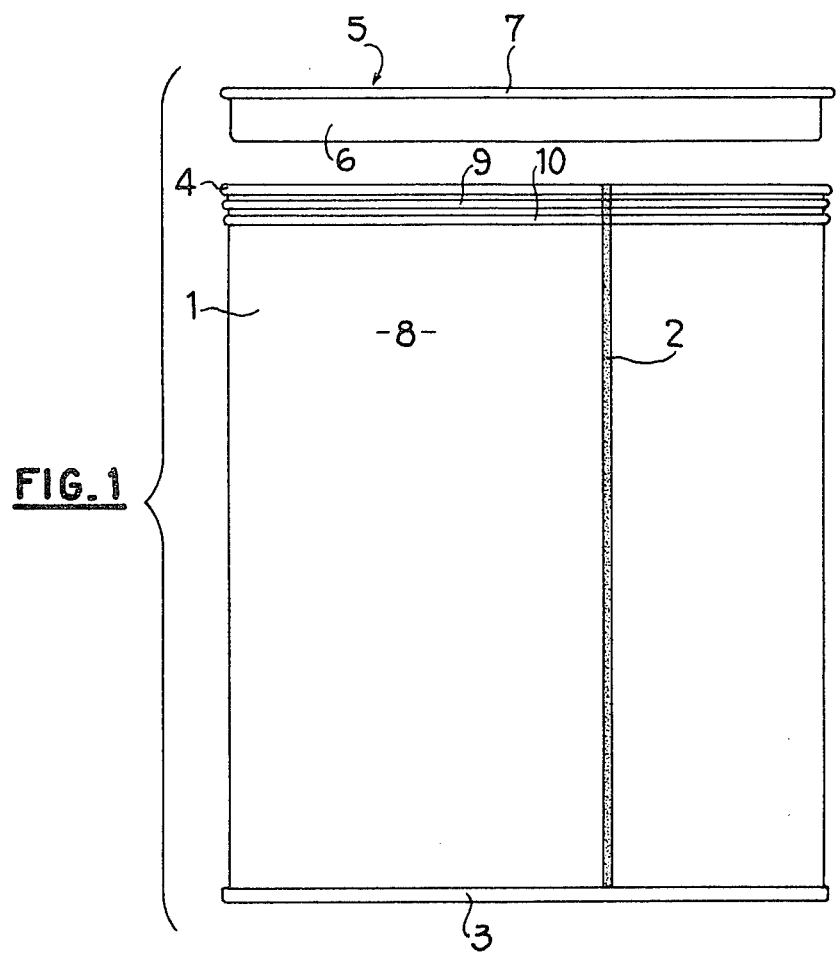
FIG. 1 is a side elevational view of a pack can of tinned iron sheet comprising a closing and sealing device according to the invention.

With reference to FIG. 1, a pack can of tinned iron sheet, or other recipient, for example a paint kettle, comprises a cylindrical body 1 formed in the known manner by a band of an iron sheet which is closed edge-to-edge by a longitudinal seam 2 according to the presently known technique of micro spot welding, and a bottom 3 which is assembled with the body by a forming-over operation in the known manner.

The upper edge of the can is curled outwardly as shown at 4 and the can can be closed by means of a cover 5 of a pressed-out metal of circular shape and having an outer cylindrical wall 6 whose diameter is roughly equal to the inside diameter of the opening of the can 1.

In the known manner, the cover 5 includes a curled edge portion 7 which is adapted to be engaged in the opening in the upper part of the can 4.

According to one embodiment of the invention, the can comprises in its wall 8 two adjacent circular grooves 9, 10, the groove 9 being adjacent to the curled edge portion 4 and the groove 10 being adjacent to the groove 9 below the latter relative to the edge of the box, the two grooves being located within the limits of the region of penetration of the cover, i.e. in the region in which occurs a rubbing between the wall of the can and the cover when the latter is placed in position and removed.

Figure 5:
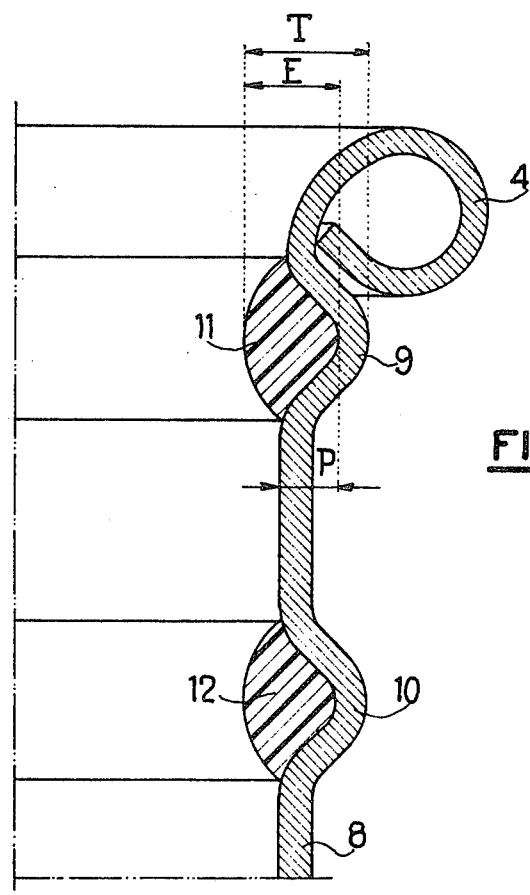
FIG. 5 is a partial view to an enlarged scale of the relationship between the grooves and the sealing element.

Disposed in each of the grooves 9 and 10 is a sealing element 11, 12 respectively of a copolymer resin (FIG. 5). This sealing element of copolymer resin having the property of very strongly adhering to the metal, is disposed in the hot condition by turning the can about its axis so as to employ centrifugal force for evenly distributing the resin which is deposited in the form of a bead in the bottom of the groove.

As shown in FIG. 5, the total thickness of each sealing element 11, 12 exceeds the depth P of each groove 9, 10, the sealing element of copolymer resin projecting consequently from the inner cylindrical surface of the can 1 in a proportion of 30 to 35/100 of a millimeter relative to the depth P of the groove.

The adherence of the polyamide resin to the metal in the groove and the projection formed by each sealing element on the wall 8 are such that, when the cover is placed in position, ie. driven with a drive fit into the opening of the can, each sealing element 11, 12 is slightly deformed in the direction of the insertion of the cover, owing to the rubbing effect, but is not pulled away from its cavity and thus ensures a perfect seal between the outer cylindrical surface of the cover and the upper surface of each of the sealing elements 11, 12.

It will be moreover observed that, owing to the nature of the copolymer resin, which tends to adhere in the hot condition to the metal, the seal afforded by the device is still further increased if the closed pack is subjected to a rise in temperature.

Figure 2:
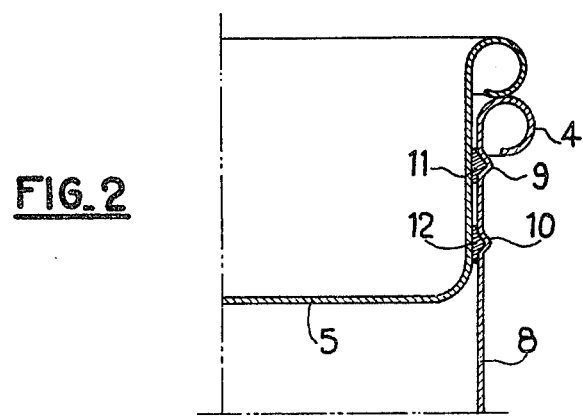
FIG. 2 is a partial view to an enlarged scale of the arrangement concerning the cover and the upper wall of the can in one embodiment in which the wall comprises two grooves each containing a sealing element.

FIG. 2 shows the cover 5 in position and it can be seen that each sealing element 11, 12 is slightly deformed and flattened on each side of the groove in which it is adhered.

Figure 3:
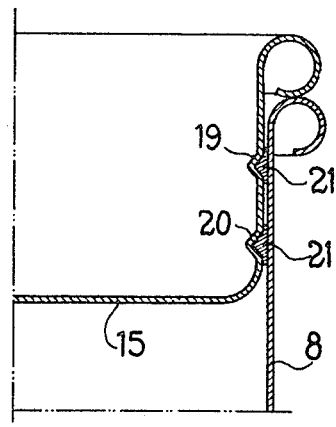
FIG. 3 is a partial view similar to FIG. 2 of another embodiment in which the cover comprises two grooves each containing a sealing element.

FIG. 3 shows a second embodiment of the invention in which the grooves 19, 20 are formed in the outer cylindrical wall of the cover 15, the upper region of the inner surface of the wall 8 of the can being devoid of a groove. In this embodiment, a sealing element of copolymer resin 21 is disposed and adhered in each of the grooves 19 and 20 of the cover.

Figure 4:
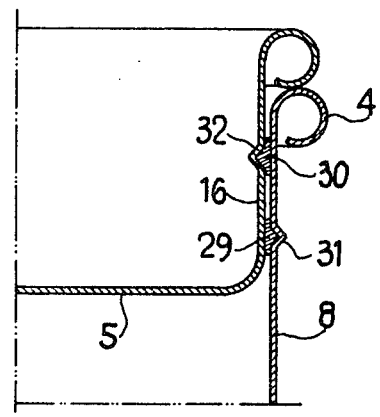
FIG. 4 is a view similar to FIG. 3 of a third embodiment in which the cover and the can each comprise a groove containing the sealing element.

According to the embodiment shown in FIG. 4, a first groove 31 is formed in the wall 8 of the can 1, and a second groove 32 is formed in the outer cylindrical wall 16 of the cover 5, a sealing element 29, 30 of copolymer resin being disposed in each of the grooves respectively.

In each of the foregoing embodiments, the groove remote from the edge of the can is located within the limit of the penetration of the cover in the can and the proportion between the thickness of the copolymer sealing element and the depth of the groove is similar to that shown in FIG. 5.

In order to dispose the sealing element of polyamide resin in the groove or grooves formed in the outer cylindrical surface of the cover, the latter is disposed in a support which is rotatable about a horizontal-axis, so that the cylindrical wall rotates in a vertical plane. The sealing element of copolymer resin is then disposed in the hot condition in the form of a bead in each groove so that it adheres perfectly to the metal.

Another object of the invention is to provide a process for forming and disposing a sealing element of copolymer resin in a groove formed in a wall of a pack can of metal or in the outer cylindrical wall of a metal cover for such a pack.

In order to dispose the sealing element of copolymer resin in the grooves formed in the inner surface of the wall of a can such as 1, the latter is made to rotate about its axis at a circumferential speed of 55 meters per minute ±2/1000, said part of the wall is heated to a given temperature between 195° C. and 205° C., a bead of copolymer resin is disposed by means of a nozzle having an extremely small orifice at a temperature within the range of 215° C. to 225° C. by the use of centrifugal force so as to distribute evenly the resin in each groove. With this process, very thin polyamide resin beads are adhered in their corresponding housing groove and their outer surface has a partly round-section and perfectly even shape.

As concerns the covers, after having disposed the latter is a rotary support adapted to rotate them about a horizontal axis, the beads of resin are disposed under the same conditions of temperature of the resin and cover by rotating the latter in a vertical plane, except that centrifugal force is not employed in this case, since the resin normally penetrates each groove.

Many tests carried out have shown that cans of this type comprising such a sealing device have a high resistance to impacts and to prolonged exposure to heat, in the case of products having a high pourcentage of expansion, which solves the problem of the expansion of the cover in cans having a total opening.

Having now described my invention what I claim as new and desire to secure by Letters Patent is:

1. A sealing device for a cylindrical metal pack having a total opening and comprising a recipient, a pressed-out cover, the recipient having an inner peripheral surface devoid of an inner radial flange and defining the opening of the recipient, and the cover having an outer cylindrical surface which directly cooperates with the inner peripheral surface of the recipient when the cover is inserted in the recipient, said device comprising at least one annular groove formed in one of two elements consisting of the cover and the recipient, at least one sealing element of a partly O-section shape and composed of a copolymer resin formed and adhered in situ in said groove, said groove being located in a region of the recipient and cover in which region occurs a rubbing between cooperating portions of said outer surface of the cover and said inner surface of the recipient when the cover is placed in position in and removed from the opening of the recipient.

2. A device according to claim 1, wherein said inner surface of the recipient comprises in said rubbing region two adjacent grooves each of which grooves contains one of said sealing element.

3. A device according to claim 2, wherein said sealing elements are those which result from disposing the material of the sealing element in the hot condition in said grooves of the recipient by rotating the recipient about its axis and employing the action of the force of gravity.

4. A device according to claim 1, wherein said outer cylindrical surface of the cover comprises at least one groove in which a sealing element is disposed.

5. A device according to claim 4, wherein said sealing element is the result of disposing the material of the sealing element in the groove of the outer cylindrical surface of the cover by rotating the latter in a vertical plane.

6. A device according to claim 1, wherein a first of said groove is formed in said inner surface of the recipient and a second of said groove is formed in said outer cylindrical surface of the cover, said second groove being disposed in such manner that, in the closed position of the pack, the second groove is located between the first groove and an outer end edge of the recipient.

7. A device according to claim 1, wherein the total thickness of the sealing element exceeds the depth of the corresponding groove, the sealing element of polyamide resin consequently projecting from said inner surface of the recipient to an extent of 30/100 mm ±0.05 relative to the depth of the groove.

8. A process for manufacturing a sealing device for a cylindrical metal pack having a total opening and comprising a recipient, a pressed-out cover, the recipient having an inner peripheral surface devoid of an inner radial flange and defining the opening of the recipient, and the cover having an outer cylindrical surface which directly cooperates with the inner peripheral surface of the recipient when the cover is inserted in the recipient, said device comprising at least one annular groove formed in one of two elements consisting of the cover and the recipient, at least one sealing element of a partly O-section shape and composed of a copolymer resin formed and adhered in situ in said groove, said groove being located in a region of the recipient and cover in which region occurs a rubbing between cooperating portions of said outer surface of the cover and said inner surface of the recipient when the cover is placed in position in and removed from the opening of the recipient, said process comprising disposing by extrusion a thin bead of a copolymer resin in the hot condition in the groove formed in one of said elements consisting of the recipient and the cover which element was previously heated to a temperature slightly lower than that of said resin, while simultaneously rotating said element about its axis.

9. A cylindrical metal pack having a total opening and comprising a recipient, a pressed-out cover, the recipient having an inner peripheral surface devoid of an inner radical flange and defining the opening of the recipient, and the cover having an outer cylindrical surface which directly cooperates with the inner peripheral surface of the recipient when the cover is inserted in the recipient, said device comprising at least one annular groove formed in one of two elements consisting of the cover and the recipient, at least one sealing element of a partly O-section shape and composed of a copolymer resin formed and adhered in situ in said groove, said groove being located in a region of the recipient and cover in which region occurs a rubbing between cooperating portions of said outer surface of the cover and said inner surface of the recipient when the cover is placed in position in and removed from the opening of the recipient.

* * * * *